United States Patent [19]

McCollum et al.

[11] 4,351,927

[45] Sep. 28, 1982

[54] GLYCOLIZED POLYESTERS

[75] Inventors: Anthony W. McCollum; William L. Edmonson, both of Longview, Tex.; Stephen N. Belote, Kingsport, Tenn.

[73] Assignee: Eastman Kodak Company, Rochester, N.Y.

[21] Appl. No.: 259,410

[22] Filed: May 1, 1981

[51] Int. Cl.³ ............................................. C08G 63/76
[52] U.S. Cl. .................................... 525/437; 525/444; 528/274; 528/302; 528/305; 528/309
[58] Field of Search ................ 525/437, 444; 528/274, 528/302, 305, 308, 309

[56] References Cited

U.S. PATENT DOCUMENTS 3,992,346 11/1976 Hartmann et al. .................. 528/302
4,238,583 12/1980 Tobias ................................. 528/302

Primary Examiner—Lucille M. Phynes
Attorney, Agent, or Firm—John F. Stevens; Daniel B. Reece, III

[57] ABSTRACT

Disclosed are compositions of matter comprising the reaction products of polyesters and 2,2-dimethyl-3-hydroxypropyl-2,2-dimethyl-3-hydroxypropionate, the reaction products containing, by weight, about 40–80% of a polyester and about 60–20% of 2,2-dimethyl-3-hydroxypropyl-2,2-dimethyl- 3-hydroxypropionate and having a hydroxyl number of about 150–300. The compositions are especially useful in high-solids coatings.

6 Claims, No Drawings

GLYCOLIZED POLYESTERS

TECHNICAL FIELD

This invention relates to novel glycolized polyesters. These new polyesters have properties that make them useful in coating compositions, and provide a means for converting scrap polyester such as polyethylene terephthalate to a soluble material having utility in coating applications.

BACKGROUND ART

Copending Application, filed 12-14-79, now U.S. Pat. No. 4,259,478 relates to a process for preparing linear, high molecular weight copolyesters with 1,4-cyclohexanedimethanol. U.S. Pat. No. 3,427,267 relates to reacting a high molecular weight polyester with a dicarboxylic acid and a polyhydric alcohol.

Numerous patents disclose processes for utilizing scrap polyesters in polymer production such as U.S. Pat. Nos. 3,222,999, 3,344,091, 4,078,143 and 4,138,374.

In U.S. Pat. No. 3,222,299 it is stated that reclaimed monomer, obtained by heating waste polymer with glycol, may be injected into the polymerization system but must be kept below a level of about 20% of the total monomer if the polymer produced is to have satisfactory properties. When amounts of recovered monomer higher than about 20% are injected, it is found that the rate of polymerization of the mixture is reduced to such an extent that the output of the equipment must be cut back to a prohibitively low level.

DISCLOSURE OF INVENTION

According to the present invention, there is provided a composition of matter comprising the reaction product of certain polyesters and 2,2-dimethyl-3-hydroxypropyl-2,2-dimethyl-3-hydroxypropionate which is also known as hydroxypivalyl hydroxypivalate. This compound will sometimes be referred to herein as HPHP.

The polyesters used as the reactant with HPHP is derived, at least in major portion, from a dicarboxylic acid component comprising at least one of the acids terephthalic, isophthalic and orthophthalic. At least a major portion of the glycol component of the polyester is chosen from glycols having 2 to 24 carbon atoms. Ethylene glycol, butylene glycol and 1,4-cyclohexanedimethanol, or combinations thereof, are preferred. Such polyesters are well known by those skilled in the art and many are commercially available, e.g., poly(ethylene terephthalate), poly(butylene terephthalate) and poly(1,4-cyclohexane dimethyl terephthalate).

Up to an amount of about 40 mole % (based on a total dibasic acid content of 100 mole %) of other acids having 4 to 20 carbon atoms may be used in preparing the polyesters. Such acids include succinic; glutaric; adipic; azelaic; sebacic; fumaric; maleic; itaconic; 1,4-cyclohexanedicarboxylic; phthalic; terephthalic and isophthalic. Other useful glycols include propylene glycol, 1,3-propanediol; 2,4-dimethyl-2-ethylhexane-1,3-diol; 2,2-dimethyl-1,3-propanediol; 2-ethyl-2-butyl-1,3-propanediol; 2-ethyl-2-isobutyl-1,3-propanediol; 1,3-butanediol, 1,4-butanediol; 1,5-pentanediol; 1,6-hexanediol; 2,2,4-trimethyl-1,6-hexanediol; thiodiethanol; 1,2-cyclohexanedimethanol; 1,3-cyclohexanedimethanol; 2,2,4,4-tetramethyl-1,3-cyclobutanediol and p-xylylenediol.

Several catalytic and non-catalytic methods of preparation of HPHP are known, all starting from hydroxypivaldehyde. For the thermal, non-catalytic method see U.S. Pat. No. 3,057,911, the disclosure of which is incorporated herein by reference, or J. Org. Chem., 25, 2219 (1960).

The compositions of this invention are prepared by reacting the polyester with HPHP at a temperature in the range of about 210° C. to 240° C. in the presence of a transesterification catalyst. The weight ratio of HPHP to polyester can be varied within the range of 60/40 to 20/80 to give a new resin with the desired physical properties and a hydroxyl number within the range of about 150 to 300.

The polyesters and copolyesters useful in this invention in addition to poly(ethylene terephthalate) are polyesters such as poly(butylene terephthalate), poly(cyclohexanedimethyl terephthalate), and the o-phthalate or isophthalate polyesters and copolyesters.

Hydroxypivalyl hydroxypivalate imparts unique properties to polyesters upon glycolisis in comparison to other glycols. The HPHP glycolized polyesters of this invention have excellent solubility in common organic solvents whereas glycolized polyesters prepared with other glycols are either insoluble or have poor solubility in common organic solvents. This result was quite unexpected and could not have been predicted by one skilled in the art. Glycolized polyesters prepared with many glycols normally have poor solubility in common organic solvents.

Suitable transesterification catalysts are well known in the art and include dibutyl tin oxide, tetraisopropyl titanate and stannous octanoate. Conventional catalytic amounts, from about 0.05 to about 1.0% based on total reactants, are used. The reaction is normally carried out with stirring for a time of about 2 to about 4 hours. The reaction product is a liquid having a viscosity of about 15,000 to about 250,000 cp. at 100° C., a hydroxyl number of about 150 to about 300, and an acid number of about 1 to about 5.

The modified polyesters described above are readily formulated into high-solids coatings having solids contents of about 75 weight percent or greater. Coatings formed from these compositions have excellent gloss, solvent resistance, impact resistance, stain resistance and humidity resistance.

To form coating compositions from the modified polyesters, they are dissolved in suitable solvents. The modified polyesters in accordance with this invention have excellent solubility in conventional organic solvents such as ketones, alcohols, esters and aromatic hydrocarbons such as xylene.

The coating compositions further comprise conventional crosslinking agents such as condensation products of formaldehyde with amines such as, for example, melamines. Hexaalkoxymethylmelamines in which the alkoxy group contains up to 20 carbon atoms are suitable, and are commercially available as Cymel 300 and 303. Hexamethoxymethylmelamine is preferred. The crosslinking agents are normally used in amounts of about 15-35% based on the weight of the polyester. Preferably, a conventional acid catalyst such as Cycat 4040 or p-toluenesulfonic acid is used with the crosslinking agent in amounts of from about 0.2 to about 1.0% based on the weight of polyester.

Other conventional additives such as pigments, dyes, surfactants, stabilizers, flow control additives, etc., may also be used.

The coating composition containing the modified polyester according to this invention may be applied to substrates by spraying, brushing, rolling, dipping or similar ways well known to those skilled in the art.

The following examples are submitted for a better understanding of the invention.

EXAMPLE 1

Preparation of Hydroxypivalyl Hydroxypivalate Modified Poly-Ethylene Terephthalate Resin A reaction vessel is charged with 48.5 parts polyethylene terephthalate resin, 51.5 parts hydroxypivalyl hydroxypivalate, and dibutyltin oxide catalyst (0.1 weight percent based on the total reactants charge weight). The reaction is then heated (with stirring) at 230° C. for two hours. The modified resin so produced has the following typical properties, depending on the exact source of poly-ethylene glycol terephthalate employed: 1-3 acid number, 250-280 hydroxyl number, and 21,000-22,000 cp viscosity at 100° F.

Such a hydroxypivalyl hydroxypivalate modified resin possessing an acid number of 1.4 and hydroxyl number of 268 has utility as a coating resin as illustrated below.

A ball mill jar is charged with 200 grams HPHP modified resin prepared as described in Example 1 above, 22.5 grams Ektasolve EE acetate, 71.2 grams Cymel 303 crosslinking resin, 180.8 grams TiO$_2$ pigment, and 35.0 grams of a solvent blend composed of methyl ethyl ketone/ethylene glycol monoethyl ether acetate/n-butanol (50/30/20). This mixture is then ground (dispersed) until a Hegman grind of 7-8 is achieved, then 2.71 grams of a 10 percent L-5310 solution in ethylene glycol monoethyl ether acetate is added plus 3.39 grams Cycat 4040 crosslinking catalyst solution and 15 grams additional solvent blend. After thoroughly mixing the above components the resulting enamel is spray applied to cold rolled steel panels and cured by baking 20 minutes at 300° F. The resulting coating exhibited outstanding solvent and stain resistance, excellent gloss and impact resistance.

EXAMPLE 2

Preparation of Hydroxypivalyl Hydroxypivalate Modified Poly-Ethylene Terephthalate Resin A reaction vessel is charged with 61 parts polyethylene glycol terephthalate resin, 39 parts hydroxypivalyl hydroxypivalate, and dibutyltin oxide catalyst (0.1 weight percent based on the total reactants charge weight). The reaction is then heated (with stirring) at 230° C. for two hours. The modified resin so produced has an acid number of 2.4, hydroxyl number of 200, and 237,500 cp viscosity at 100° F. This resin can be formulated into an enamel coating described as follows.

A ball mill jar is charged with 200 grams HPHP modified resin prepared as described in Example 2 above, 22.2 grams ethylene glycol monoethyl ether acetate, 53.2 grams Cymel 303 crosslinking resin, 168.8 grams TiO$_2$ and 60 grams solvent blend (methyl ethyl ketone/ethylene glycol monoethyl ether acetate/n-butanol, 50/30/20). This mixture is then ground (dispersed) until a Hegman grind of 7-8 is achieved, then 2.5 grams of a 10 percent L-5310 solution in ethylene glycol monoethyl ether acetate is added along with 3.2 grams Cycat 4040 crosslinking catalyst solution and 54.8 grams additional solvent blend. After thoroughly mixing the above components the resulting enamel is spray applied to cold rolled steel panels and cured by baking 20 minutes at 300° F. The resulting coating exhibited outstanding solvent and humidity resistance and excellent gloss, stain resistance, and impact resistance.

EXAMPLE 3

Glycolized poly-ethylene terephthalates are prepared according to the procedure given in Example 2. The glycol used, the amount of reactants, and the reaction temperature are listed below. The catalyst used in all runs is 0.1 weight percent dibutyltin oxide.

| Run No. | Glycol | Hydroxyl No. of Glycolized Polyester | Charge Weight, g Glycol | Poly(Ethylene Terephthalate) | Reaction Temp., °C. |
|---|---|---|---|---|---|
| 1 | Neopentyl Glycol | 363 | 175 | 325 | 230 |
| 2 | 2,2,4-Trimethylpentane-1,3-diol | 307 | 216 | 284 | 220 |
| 3 | HPHP | 276 | 258 | 242 | 230 |
| 4 | HPHP | 254 | 258 | 242 | 230 |
| 5 | HPHP | 225 | 195 | 305 | 230 |

The solubilities of the above glycolized polyester resins are determined in various solvents and the results are shown in the following table.

| Glycol | Hydroxyl No. of Glycolized Polyester | Solubility Data: Solvent* | | | |
|---|---|---|---|---|---|
| | | Xylene | Ethylene Glycol Monoethyl Ether Acetate | Methyl Ethyl Ketone | Xylene: Ethylene Glycol Monobutyl Ether (80/20) |
| Neopentyl Glycol | 363 | I | I | I | I |
| 2,2,4-Trimethylpentane-1,3-diol | 307 | I | I | I | I |
| HPHP | 276 | S | S | S | S |
| HPHP | 254 | S | S | S | S |
| HPHP | 225 | S | S | S | S |

*Solubility is determined at a 75 percent solids level in the solvent listed.
I = insoluble and S = soluble.

Unless otherwise specified, all parts, percentages, ratios, etc., are by weight.

The application has been described in detail with particular reference to certain preferred embodiments thereof, but it will be understood that variations and modifications can be effected within the spirit and scope of the invention.

We claim:

1. Composition of matter comprising the reaction product of
   (a) a polyester derived from an acid component comprising at least one of the acids terephthalic, isophthalic, and orthophthalic and a glycol component having from 2 to 24 carbon atoms, and
   (b) 2,2-dimethyl-3-hydroxypropyl-2,2-dimethyl-3-hydroxypropionate said reaction product containing, by weight, about 40–80% of (a) and about 60–20% of (b) and having a hydroxyl number of about 150–300.

2. Composition according to claim 1 wherein at least a major portion of the glycol component is selected from ethylene glycol, butylene glycol and 1,4-cyclohexanedimethanol.

3. Composition according to claim 1 wherein the acid component comprises at least 60 mole % of an acid selected from terephthalic, isophthalic and orthophthalic, and up to 40 mole % of at least one different dibasic acid having from 4 to 20 carbon atoms.

4. Process for preparing a composition which can be formulated into a high-solids coating solution comprising reacting, at a temperature of about 210° C.–240° C. in the presence of a transesterification catalyst
   (a) about 40–80 weight % of a polyester derived from an acid component selected from at least one of the acids terephthalic, isophthalic and orthophthalic and a glycol component, at least a major portion of which is selected from at least one of the glycols ethylene, butylene and cyclohexanedimethanol, and
   (b) about 60–20 weight % of 2,2-dimethyl-3-hydroxypropyl-2,2-dimethyl-3-hydroxypropionate.

5. Process according to claim 4 wherein at least a major portion of the glycol component is selected from ethylene glycol, butylene glycol and 1,4-cyclohexanedimethanol.

6. Composition according to claim 4 wherein the acid component comprises at least 60 mole % of an acid selected from terephthalic, isophthalic and orthophthalic, and up to 40 mole % of at least one different dibasic acid having from 4 to 20 carbon atoms.

* * * * *